J. C. BACKUS.
SELECTIVE GEAR SHIFTING MECHANISM.
APPLICATION FILED OCT. 1, 1914.
1,223,656.
Patented Apr. 24, 1917.
3 SHEETS—SHEET 1.
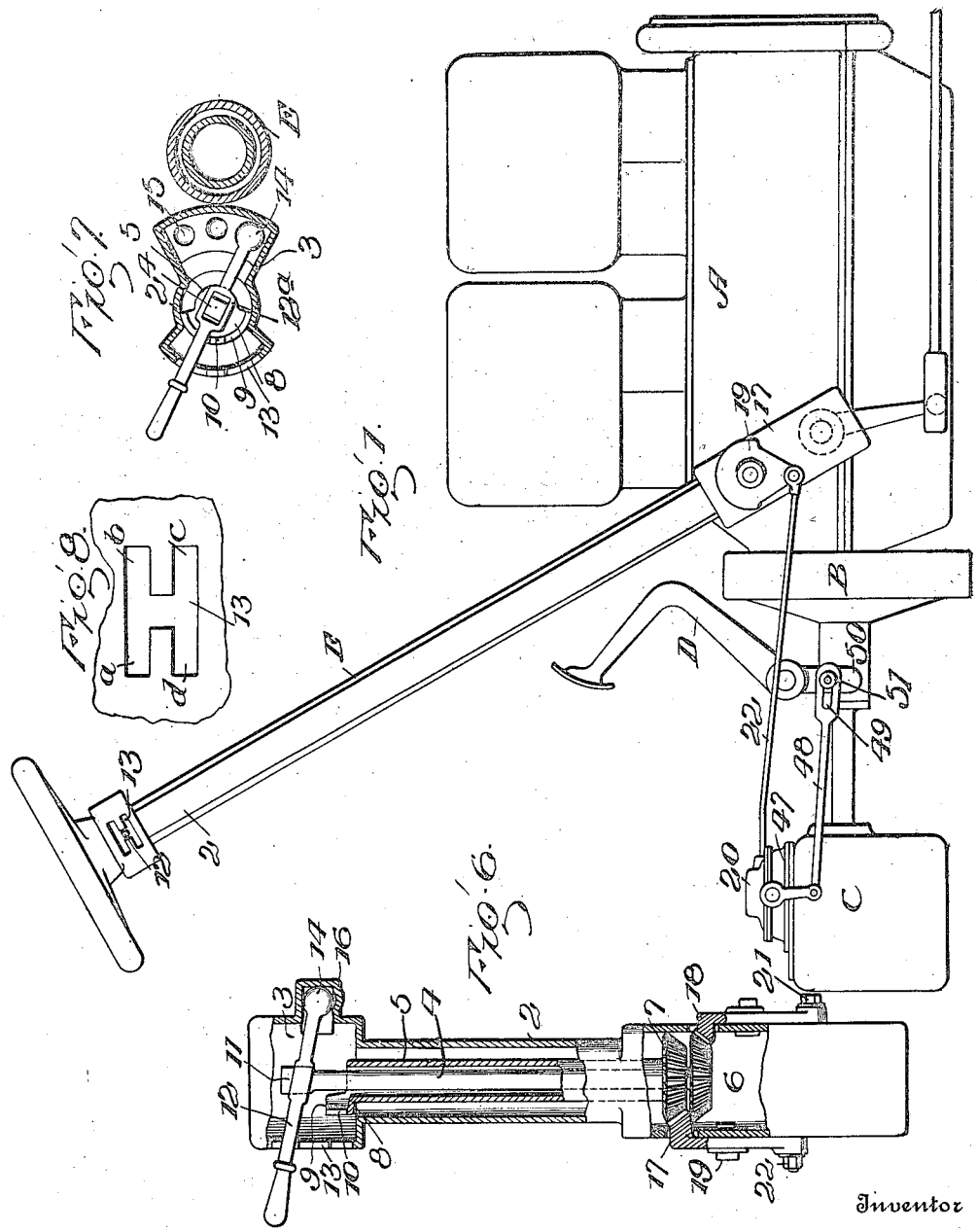
Inventor
J. C. Backus

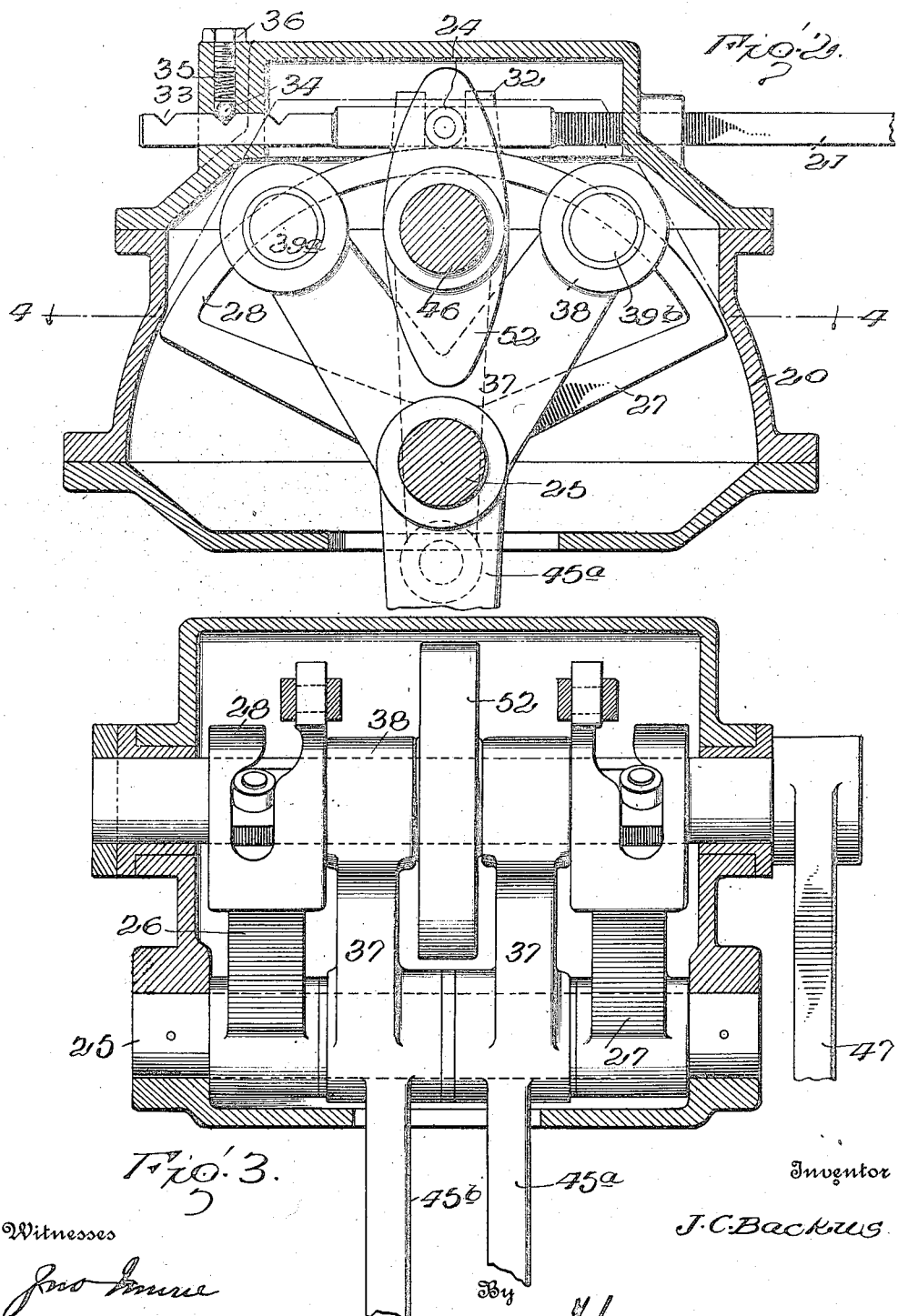

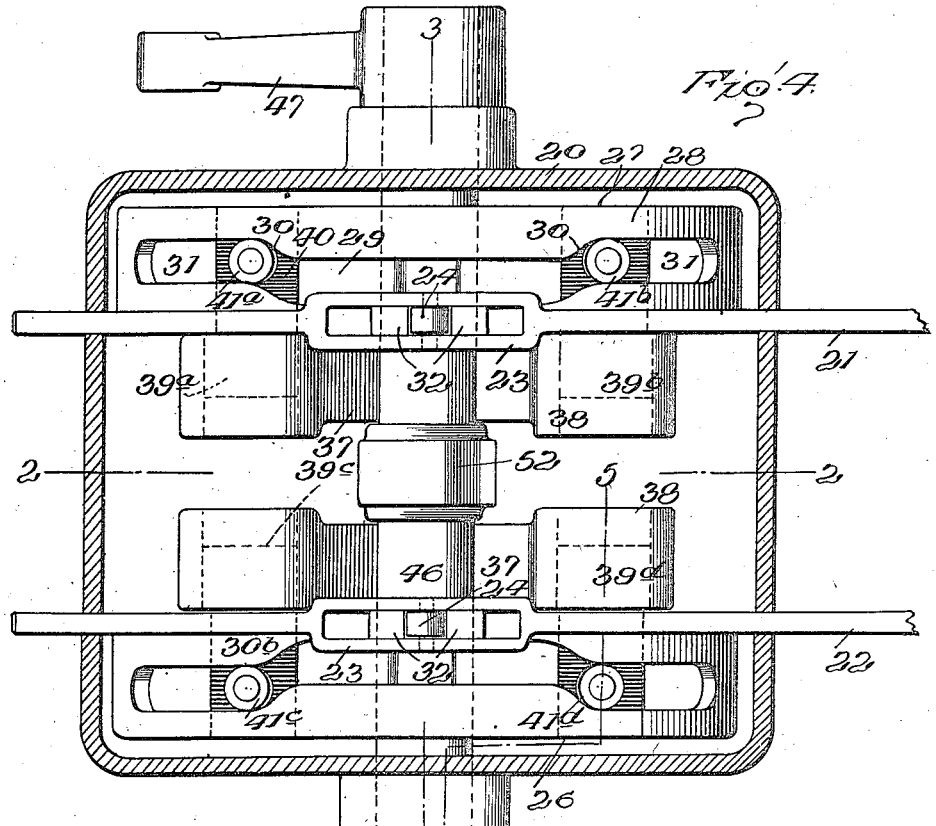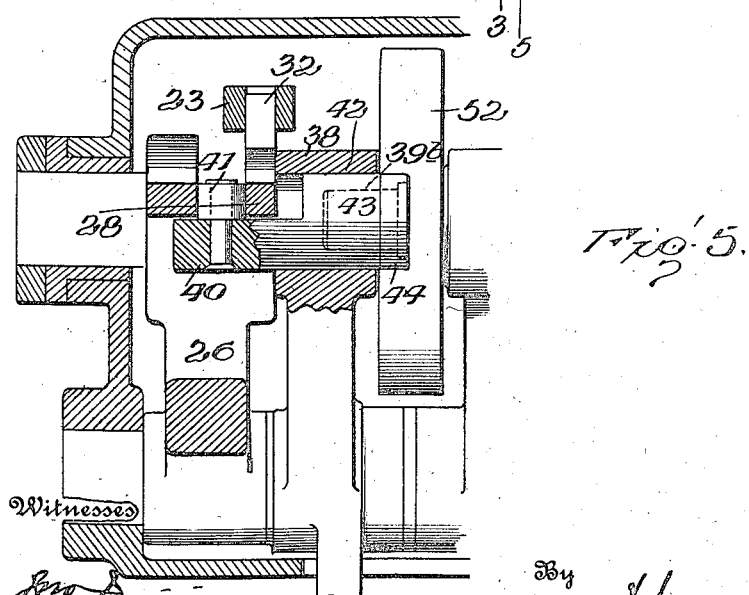

UNITED STATES PATENT OFFICE.

JOHN CLAYTON BACKUS, OF SMETHPORT, PENNSYLVANIA.

SELECTIVE GEAR-SHIFTING MECHANISM.

1,223,656.      Specification of Letters Patent.      Patented Apr. 24, 1917.

Application filed October 1, 1914. Serial No. 864,454.

*To all whom it may concern:*

Be it known that I, JOHN CLAYTON BACKUS, citizen of the United States, residing at Smethport, in the county of McKean and State of Pennsylvania, have invented certain new and useful Improvements in Selective Gear-Shifting Mechanisms, of which the following is a specification.

This invention relates to gear shifting devices, and particularly to that class of gear-shifting devices wherein the gear to be shifted is first "selected" and then power applied to shift the gear.

The primary object of my invention is to overcome difficulties ordinarily met with in gear shifting mechanisms by providing mechanical means for selecting the gear to be shifted and providing clutch pedal operated means for shifting the gear so selected.

A further object is the provision of a gear selecting mechanism which may be operated at any time in advance of the actual shifting of the gears, leaving the actual shifting of the gears to be later accomplished by a movement of the clutch-pedal itself.

A further object is the provision of a gear shifting mechanism including a selector mechanism operable by a small control lever located adjacent the steering wheel, the gear so selected being thus made shiftable through operative connection between the gear and the clutch.

A still further object of the invention is to so construct the selector mechanism that it may be set to move the gears into any desired speed position at any time, irrespective of the direction in which the vehicle is running or the speed positions to which its gears may be set, the gears of the transmission being moved only upon movement of the clutch.

A further object in connection with the above is to provide a mechanism so constructed that if the selector mechanism is set to change the transmission from one speed to another a movement of the clutch to inactive position will return the gears to neutral position, after which a return movement of the clutch to active position will move the selected gears of the transmission to whatever position is indicated or provided for by the setting of the selector mechanism. By this construction the driver may anticipate such change of gears as may be necessary and set the selector mechanism for such change at any time before the necessity of the change arises. When so set the change may be made at any time by merely throwing out and then again letting in the clutch through manipulation of the clutch pedal.

A still further object of the invention is to so construct the selector mechanism that when the clutch is completely out and the gears are in neutral position the selector mechanism will be locked, thus rendering it proof against accidental movement.

A further object of the invention is to so construct the gear selecting and shifting mechanism as to do away with the use of springs or like devices, thus rendering every movement a positive mechanical movement.

A further object is to so construct the mechanism that the meshed gears may be withdrawn from engagement at exactly the proper time; that is, withdrawn from engagement while the clutch is released.

Still another object is to increase the simplicity of a mechanism of this kind and provide a mechanism for the purpose which shall be small, compact, light in weight, and inexpensive to manufacture and install.

My invention is illustrated in the accompanying drawings, wherein:—

Figure 1 is a side elevation of an automobile engine, the clutch casing, the gear casing, the steering post and the exterior casing of the selecting mechanism.

Fig. 2 is a longitudinal section on the line 2—2 of Fig. 4.

Fig. 3 is a transverse section on the line 3—3 of Fig. 4.

Fig. 4 is a top plan view of the mechanism shown in Figs. 2 and 3, the figure being partly in section on the line 4—4 of Fig. 1.

Fig. 5 is a fragmentary section on the line 5—5 of Fig. 4, but showing one of the cam-engaging plungers or buckets projected.

Fig. 6 is a vertical enlarged section through the casing carrying the selector lever, shaft and selector gears.

Fig. 7 is a cross section on the line 7—7 of Fig. 6.

Fig. 8 is a face view of the H-slot.

Corresponding and like parts are referred to in the following description and indicated in all the views of the accompanying drawings by the same reference characters.

Referring to these drawings and particularly to Fig. 1, A designates the engine of the automobile; B the clutch; C the casing inclosing the transmission gears and D the clutch pedal. Inasmuch as all these parts are well-known and form no part of my invention it is unnecessary to describe them in detail.

Disposed adjacent to and parallel with the steering post E is an upwardly and rearwardly extending casing designated 2, terminating at its upper end in an enlargement 3. Disposed within the casing 2 is a central shaft 4 and a concentrically disposed shaft 5. The central shaft 4 at its lower end carries a bevel gear wheel 6 while the tubular shaft 5 carries at its lower end the bevel gear wheel 7.

The upper end of the tubular shaft 5 projects slightly into the head 3 of the casing and is there provided with a sector 8 having an upturned flange 9 formed at its middle with a notch 10. The shaft 4 at its upper end is formed with a squared head 11 of greater cross sectional area than the portion below the head which is circular in cross section. Disposed within the head 3 of the casing is a selector lever 12. This lever at its handle end projects out through an H-shaped slot 13 formed in one side of the head 3 and at its other end is formed with a spherical terminal 14 adapted to engage in any one of a plurality of seats 15 formed in an arcuate extension 16 having a depth slightly greater than the diameter of the spherical terminal 14. This terminal is adapted to seat in any one of these sockets or seats 15 and these seats form each a fulcrum for the lever to permit the lever to be moved vertically. I have thus provided what may be termed a shiftable ball and socket joint for the inner end of the lever.

It will be seen that in neutral position of the lever the eye 12ᵃ of the lever will be below the square head 11 of the shaft 4, but the lever will not be in engagement with the sector 9. Downward movement of the free end of the lever, however, will carry it into engagement with the notch 10 of the sector 9. A full upward movement of the lever will carry its eye 12ᵃ into engagement with the square head 11 of the shaft 4. When so engaged a rotation of the lever will cause a rotation of the shaft 4. When the lever is shifted downward into engagement with the sector 9 a rotation of the lever will cause a rotation of the tubular shaft 5. It will be seen that the shafts 4 and 5 may thus be independently rotated in either direction.

The lower end of the casing 2 terminates in a supporting casing 17 within which the bevel gear wheels 6 and 7 are inclosed. Mounted upon the sides of the casing 17 are the segment gears 18 and 19. Each of these gears has an inwardly turned arcuate extremity toothed to engage with one of the gears 6 or 7. Thus the segment 18 engages with the gear 6 while the segment 19 engages with the gear 7. Each segment is downwardly prolonged beyond its pivotal point and there connected to a rod leading into the casing 20. There are two of these selector rods, one being designated 21 and the other 22, as shown clearly in Fig. 4.

The casing 20 is rectangular in plan and extending into and across this casing are the rods 21 and 22. Each of these rods at its middle is formed with a yoke 23 and carried by each yoke is a roller 24. Passing through the lower portion of the casing is a transversely extending fixed shaft 25, and rotatably mounted upon this shaft at opposite ends of the casing are the sectors 26 and 27. Each of these sectors has a peripheral rim 28 or a selector cam-plate formed with a longitudinally extending slot. This slot as shown in Fig. 4 has a middle portion 29 which extends parallel to the side edge of the sector and oppositely disposed outwardly inclined portions 30 and terminals 31 which again extend parallel to the side edges of the sector. These slots 29 are cam slots. Projecting upward from the middle of each sector are the oppositely disposed lugs 32 spaced from each other to receive between them the roller 24. These lugs 32 extend up within the yoke 23, as shown clearly in Fig. 4. Preferably each of the rods 21 and 22 is notched at a plurality of points as at 33 (see Fig. 2) and a spring-actuated detent 34 is engageable in one or the other of these notches. As illustrated, this spring detent consists of a small ball urged into engagement with the corresponding rod 21 or 22 by means of the spring 35, the tension of this spring being regulatable by means of a screw 36. There are three notches 33 corresponding to the three positions which the rods 21 and 22 assume.

Also mounted upon the shaft 25 and rotatable therearound are the oppositely disposed V-shaped members 37. The upwardly and outwardly diverging arms of each V-shaped member carry at their outer ends the hollow heads 38 within which are disposed the transversely reciprocatable plungers, designated respectively 39ᵃ, 39ᵇ, 39ᶜ and 39ᵈ. Each plunger at its outer end is extended as at 40 and carried upon this extension of each plunger is a roller which operates in a corresponding slot 29 in one of the sectors 26 or 27, as shown clearly in Fig. 4. The outer end of each plunger is recessed at 42 (see dotted lines in Fig. 5) and mounted in this recess is a journal or stub-shaft 43 carrying a roller 44. Each plunger has a sufficient movement or reciprocation to permit the roller 44 to be projected beyond the face of the head 38 or to permit the roller to be entirely inclosed within the head 38. Each V-shaped member 37 carries or has formed integral with it, the downwardly projecting gear shifter arm, these arms being designated respectively 45ª and 45ᵇ and being connected through operative mechanism with the gears to be shifted. A movement of one of the arms to the right will throw in one gear and a movement of the same arm to the left will throw in another gear; a movement of the other arm to the right will throw in a third gear, and a movement in the opposite direction will throw in the reverse.

In order to provide means whereby these arms 45 may be shifted in one direction or the other by the shifting of the clutch from its inactive to its active positions I provide the shaft 46 which extends entirely through the casing 20 and is suitably journaled therein, this shaft carrying at one end the radially projecting arm 47 which, as shown in Fig. 1, is connected to a link 48, whose extremity is slotted as at 49. The clutch lever D has a downward extension 50 provided with a laterally projecting pin and roller 51 engaging in the slot 49. When, therefore, the clutch lever is shifted the pin and roller 51 will move along the slot 49 for a certain distance and then will act upon the link 48 and turn the shaft 46.

Mounted upon the shaft 46 midway between the rods 21 and 22 and midway between the pairs of heads 38 is a cam 52. This cam is elliptical in form as illustrated most clearly in Fig. 2. When the clutch is in the longer axis of the cam is vertical. When the clutch pedal is moved to either engage or disengage the clutch, the cam is turned in one direction or the other and will pass between the pairs of heads 38 and if one of the plungers 39 is projected the cam will engage the roller 44 carried by said plunger and, therefore will turn the V-shaped member 37 in the direction of movement of the cam, shifting the arm 45 connected thereto in a reverse direction to the direction of movement of the cam. The particular member 37 which will be engaged by the cam and the direction in which this member will be thrown therefore, depends entirely upon which of the four plungers 39 is projected.

In order to secure a full understanding of the operation of this mechanism reference will first be had to the operation of one selecting rod, as for instance rod 21, one sector 27, the plungers 39ª and 39ᵇ and the arm 45ª.

The shifting of the selector lever 12 to one end or the other of the upper part of the slot 13 will cause the shaft 4 to rotate in one direction or the other. If now the lever 12 be lifted from its neutral position into the upper slot and be drawn rearward to its full extent, it will rotate gear 6 in a clock-wise direction. This movement of the rod 21 will cause a movement of the selector cam-plate or sector 27 in a counterclockwise direction which will cause the roller 41ª of the plunger 39ª to move into the portion 29 of the cam slot and so project the plunger 39ª and will cause the roller 41ᵇ to be disposed at the extreme right-hand end of portion 31. If now the clutch be thrown out by pressing on pedal D, the first one-fifth of the movement of the clutch lever will be taken up by slot 49. The next two-fifths of the movement will act to shift the cam 52 into engagement with the plunger 39ª, and the next two-fifths of movement will cause a further rotation of the cam 52 and cause it to shift the plunger 39ª with the sector 27 toward the left in Figs. 2 and 4, the arm 45ª of course moving toward the right. This will shift the connected transmission gear (as for instance the low speed gear) into active position.

It will be seen that during the movement of the sector 27 through movement of the rod 21, the heads 38 remain stationary although the plunger 39ª is projected. The subsequent movement of the arms 37, caused by engagement of the cam 52 with the plunger 39ª of course swings the heads 38 and also, because the sector 27, remains stationary at this time, finally causes a retraction of the plunger 39ª, the rollers 41ª and 41ᵇ then occupying the same relative position in the cam slot of the sector 27 as they do in normal position, although the sector is turned to its extreme left hand position. Because of this, both of the plungers 39ª and 39ᵇ are in retracted position and the cam 52 may return to vertical position when the clutch is let in.

Now if the selector rod 21 be returned to its neutral position, it will shift sector 27 to its neutral or central position with the plunger 39ª and 39ᵇ still in their extreme left-hand position. This shifting of the sector 27 will have caused the projection of the plunger 39ᵇ into the path of the cam 52 so that the next time the clutch is released the cam 52, after completing one-fifth of its movement, will engage with the plunger 39ᵇ, shifting it to the right until such time as the roller 41ᵇ is retracted by engaging the inclined portion 30 of the slot, thus retracting the plunger 39ᵇ. The cam will, of course, continue the last two-fifths of its movement past the plunger 39ᵇ, leaving the shifter arm 45ª in its neutral position.

If instead of being moved to its neutral position, the rod 21 had been shifted to the right the full extent of its stroke, plunger 39ᵇ would have remained projected in contact with cam 52 and the shifter lever would have moved past its neutral position to the left in Fig. 2, thus shifting the other gear into active position, and in condition for operation just as soon as the clutch is drawn in. Thus it will be seen that if the shifter arm 45ª is in either one of its active positions the movement of the rod 21 to its neutral or central position will cause the right plunger to be protruded into contact with cam 52 to cause the arm 45ª to shift to its neutral position upon the next release of the clutch.

For a three speed ahead and reverse transmission gear, there are provided the two shifter arms 45ª and 45ᵇ, each having its own selector mechanism, and disposed between them as heretofore described is the cam 52 which operates either one of the arms and operates either arm in either direction depending on how the selector is set. The statement above with relation to the operation of a two-speed gear is equally true of a three-speed ahead and one reverse transmission. No matter what gear is being used, if the selector lever is moved to its neutral position, that is, to the position shown in Fig. 1, the next movement of the clutch pedal to release the clutch will throw all the gears into neutral position.

In the drawings the upper portion of the H-shaped slot 13 controls the low speed and reverse gears while the lower portion of the H-shaped slot controls the intermediate and the high gears. In starting the car the selector lever is raised up and pulled toward the rear; that is, toward the point $a$ in Fig. 8. This will, through the connections heretofore described cause the projection of the plunger 39ª into the path of movement of the cam 52, so that when the clutch is thrown out the shifter arm 45ª will move forward and throw the low gear into mesh. Now the clutch is let in gently and while the car is getting up the proper momentum the selector lever is moved forward to center downward and forward to the end $c$ of lower slot (Fig. 8). This will leave selector rod 21 in its neutral position which will cause the plunger 39ᵇ to be projected for contact with cam 52. The placing of selector lever in the forward end $c$ of the lower slot will cause the projection of the plunger 39ᶜ into the path of movement of cam 52. Now when clutch is thrown out cam 52 will engage with plunger 39ᵇ and cause arm 45ª to move rearward until it reaches the neutral position where it will stop, inasmuch as the plunger 39ᵇ will then be retracted, as heretofore described. At this moment cam 52 engages with plunger 39ᶜ which will cause the arm 45ᵇ to move upward, thereby bringing into mesh the intermediate set of gears.

Now after the clutch is let in and the speed of the car accelerated the selector lever is moved clear back to the rearward end $d$ of the lowermost portion of the H-slot 12, the rod 22 will be moved to its extreme forward position, thereby shifting the selector cam-plate 28 or sector 26 into a position that will shift plunger 39ᵈ outward. Plunger 39ᵈ will be held in its projected position until arm 45ᵇ has been moved from its extreme forward position, passing by neutral position to its extreme rearward position, thereby withdrawing the intermediate gears and throwing in the high speed gears.

It is to be particularly noted that every plunger after leaving the predetermined position at which it has been set is removed from the path of movement of the cam 52 by the action of the cam slot and corresponding selector cam plate, thereby permitting the free use of the clutch. This condition is unchanged until a selector plate is again moved when the proper plunger is again extended into the path of movement of the cam 52.

It is to be particularly observed that no plunger can be pushed out into operative position, that is, into the path of the cam 52 unless the cam 52 is behind the plunger ready to operate. Thus assuming all the gears to be in a neutral position and the clutch pushed out, then cam 52 will have made a quarter turn and its ends will be in the path of all the plungers, locking them from any movement into operative position. This makes the construction proof against wrongful operation.

It will also be observed that the operator can select any desired gear without relation to any other gear and the decision as to which gear to throw may be changed any number of times prior to the actual throwing of the clutch.

It is to be particularly noted that when any gear is in mesh the plunger causing this gear to be drawn out of mesh will be positioned in close proximity to the cam 52 and that this cam is so shaped that it has powerful leverage for starting the gears.

Experience has shown that if the gears are withdrawn at the proper time, that is, between the pull of the engine and the push of the car, the power required is entirely negligible. In this device, however, it is particularly pointed out that the meshed gears are automatically withdrawn at exactly the proper time. Therefore the actual power required for changing the gears will be so little as not to be noticed. It is likewise pointed out that this mechanism does not contain a single spring of any kind, that every movement is a positive movement. The mechanism has been found thoroughly effective in practice and as it is very simple it will not get out of order. The several parts are relatively small and therefore the mechanism may be very compact.

With the mechanism forming the subject matter of this invention I entirely overcome the difficulties ordinarily met with and a beginner even can shift the gears as successfully as an experienced driver. This is due to the fact that the mechanism between the clutch and the selector mechanism is such as to insure positive and instantaneous movement of the gears selected, either into or out of mesh at exactly the proper moment, this being due to the fact that the action of throwing out and letting in the clutch determines such moment. Both hands of the driver are free, so far as the gear shifting operation is concerned, as the setting of the selector mechanism has been previously accomplished. One hand of the driver may therefore be used for steering and the other for manipulating the hand throttle lever, both hands, therefore, remaining upon the steering wheel. One foot is, of course, upon the clutch pedal and the other may remain upon the service brake-pedal.

My invention, therefore, obviates one of the most difficult features of motor-car driving. It also prevents injury to the gears, renders gear shifting easy and thereby prolongs the life of the engine, as it reduces the tendency of drivers to run upon wrong gear settings rather than shift the gears, thus straining the engine.

It is possible with this construction for the driver to vary the selection of the gear position desired as many times as he deems advisable or as becomes necessary before operating the clutch pedal. This anticipation of the change of gears makes toward safety, as the operator can decide in advance what the change will be, set the selector mechanism for such change and then make the change at his leisure.

While I have illustrated what I believe to be the best form of my invention I do not wish to be limited to the exact construction illustrated and described, as it is obvious that many minor changes might be made without departing from the spirit of the invention as specified in the claims.

Having thus described the invention what is claimed as new is:—

1. In a gear shifting mechanism, a movable actuating element, a plurality of gear shifting devices including members movable into or out of the path of movement of the actuating element, and selecting mechanism operatively connected to said members to shift them into or out of said path of movement.

2. In a gear shifting mechanism, a movable actuating element, a pair of connected gear shifting members disposed one on each side of the actuating element, selecting mechanism operatively connected to shift either one of the gear shifting members into or out of the path of movement of the actuating element, and means acting to move the projected gear shifting member from its engagement with the actuating element after the actuating element has shifted the gear shifting member.

3. In a gear shifting mechanism, a movable actuating element, a pair of gear shifting members disposed for reciprocation on each side thereof and operatively connected to the gears to be shifted, and gear selecting means, said means in a neutral position causing the retraction of all of said gear shifting members out of operative relation to the actuating element and when shifted from neutral position causing the projection of any one of said members into operative relation to the actuating element according to the position to which it is shifted.

4. In a gear shifting mechanism, a pair of connected gear shifting members mounted for reciprocation, an actuating element disposed between the gear shifting members, selecting means operatively connected to the gear shifting members, said means in neutral position causing the retraction of both of said gear shifting members from operative relation to the actuating element, but when shifted in one direction from neutral, causing the projection of one of said members into operative relation to the actuating member and when shifted in the other direction causing the projection of the other member into such operative relation, a movement of said connected gear shifting members under the action of the actuating member causing the retraction of the gear shifting member engaged by the actuating member.

5. A gear shifting mechanism, a pair of connected gear shifting members, an actuating member disposed between the gear shifting members, and selecting means operatively connected to the gear shifting members to cause a projection of one or the other of said members when shifted in one or the other direction from neutral, a movement of said connected gear shifting members because of engagement of the projected member by the actuating member causing the retraction of the gear shifting member so engaged, the selecting means upon being brought back to neutral position projecting the other gear shifting member so that upon a second movement of the actuating member in the same direction a reverse movement of the connected gear shifting members will be attained, both of said gear shifting members being retracted out of operative relation to the actuating member when the gear shifting members arrive at neutral position.

6. In a gear shifting mechanism, a rotatable actuating element, a plurality of gear shifting members, and selecting means for moving any one of said gear shifting members into operative relation to the actuating member whereby the gear shifting members may be moved to shift the selected gear into operative position upon an initial rotation of the actuating member in one direction, said means being operable to cause an automatic return of the gear shifting members to neutral position upon a second movement of the actuating member in the same direction.

7. In a gear shifting mechanism, an actuating member, a plurality of gear shifting members adapted to be operatively connected to a plurality of gears and each including a movable member, manually operable means for shifting one of said movable members into operative relation to the actuating member, and means causing a retraction of said movable member when its gear shifting member has arrived at a position where the gear connected thereto is in operative position, whereby to permit the actuating member to freely operate.

8. In a gear shifting mechanism of the character described, a clutch lever, a plurality of gear shifting elements each adapted to be operatively connected to a gear, an actuating element operatively connected to the clutch lever to be shifted thereby, a movable member carried by each of the gear shifting elements and shiftable into or out of position to be engaged by said actuating element, manually operable selecting mechanism whereby any one of said movable members may be shifted to a projected position or to a retracted position, and means causing a retraction of a projected movable element when the gear shifting element connected thereto under the action of the actuating element has arrived at a position where the gear connected thereto is in operative position whereby to permit the clutch lever to freely operate.

9. In a gear shifting mechanism, a clutch lever, a plurality of gear shifting elements, each operatively connected to a gear, an actuating element operatively connected to the clutch lever, movable members carried one by each of the gear shifting elements, selecting means for shifting any one of said movable members into a position to be engaged by the actuating member or shifting it out of such position, and means causing a retraction of a projected movable element when the selected gear shifting element has arrived at a position where the gear connected thereto is in operative position and causing a retraction of any projected movable element when the gear shifted element connected thereto has moved to a neutral position whereby to permit the clutch lever to be freely operated.

10. In a gear shifting mechanism, a gear shifting member, adapted to be operatively connected to a gear, a rotatable actuating cam, a hollow head carried by the gear shifting member, a plunger carried in the head and shiftable into or out of the path of movement of said actuating cam, and an operable device operatively connected to said plunger, and manually shiftable to project or retract the plunger.

11. In a gear shifting mechanism, a rotatable actuating cam, a gear shifting member adapted to be operatively connected to a shiftable gear, a hollow head carried by the member, a plunger carried in the head and shiftable into or out of the path of movement of the cam, a shiftable cam plate operatively connected to the plunger and operating when shifted to shift said plunger into or out of operative position, and manually operable means for shifting said plate.

12. In a gear shifting mechanism, a rotatable actuating cam, a member adapted to be connected to a shiftable gear, a plunger carried by the member and shiftable into or out of the path of movement of the actuating cam, a cam plate having a slot having two portions offset with relation to each other and connected by an inclined portion, a pin carried by the plunger engaging in said slot whereby upon a reciprocation of the cam plate, the plunger may be retracted or projected, and manually actuatable means for shifting said cam plate.

13. In a gear shifting mechanism, a rotatable actuating cam, a member adapted to be connected to a shiftable gear and having a hollow head, a plunger carried in the head and shiftable into or out of the path of movement of the actuating cam, a cam plate having a slot having two portions offset with relation to each other and connected by an inclined portion, a pin carried by the plunger engaging in said slot whereby upon a reciprocation of the cam plate the plunger may be retracted or projected, manually actuatable means for shifting said cam plate, and independent manually actuatable means for shifting said actuating cam.

14. In a gear shifting mechanism, a shiftable actuating member, a pivoted gear shifting member adapted to be operatively connected to a gear, a hollow head carried by said member, a plunger carried in the head and shiftable into or out of the path of movement of the actuating member, a longitudinally slotted cam plate disposed adjacent to the head, the plunger having operative connection with the slot of said plate, and manually operable means for shifting the plate in one direction or the other to thereby retract or project the plunger.

15. In a gear shifting mechanism, a rotatable actuating cam, manually operated means for rotating said cam, a pivoted gear shifting member, a radial arm carried by the gear shifting member and having a hollow head, a plunger carried in the head and shiftable into or out of the path of movement of the actuating cam, a sector pivoted upon the same axis as the gear shifting member, said sector having a peripheral longitudinally extending cam slot, plunger carried means operatively engaging in said cam slot, and manually operable means for shifting said sector.

16. In a gear shifting mechanism, a manually shiftable actuating member, a gear shifting member adapted through movement in one direction to shift one gear into operative position and through movement in the other direction to shift another gear into operative position, a pair of heads carried by said member and disposed one on each side of the actuating member, plungers in said heads shiftable into or out of a projected position into the path of movement of the actuating member, a movable selector plate having a cam slot with which the plungers have operative engagement and manually operable means for shifting the selector plate to cause the retraction of both of said plungers or the projection of one or the other of said plungers.

17. In a gear shifting mechanism, a rotatable actuating member, a gear shifting member adapted through movement in one direction to shift one gear into operative position and through movement in the other direction to shift another gear into operative position, a pair of heads carried by said member and disposed one on each side of the actuating member, plungers in said heads shiftable into or out of a projected position into the path of movement of the actuating member, a movable selector plate having a cam with which the plungers have operative engagement, and manually operable means for shifting the selector plate to cause the retraction of both of said plungers or the projection of one or the other of said plungers.

18. In a gear shifting mechanism, a rotatable elliptical actuating member, a gear shifting member adapted through movement in one direction, from a neutral position to shift one gear into operative position and through movement in the other direction to shift another gear into operative position, a pair of heads carried by the gear shifting member and disposed one at each side of the actuating member, plungers in said heads shiftable into or out of a projected position in the path of movement of the elliptical actuating member, a movable selector plate having a cam with which the plungers have operative engagement, and manually operable means for shifting the selector plate to neutral position whereby to cause the retraction of both of said plungers or from neutral position in one or the other direction to cause the projection of one or the other of said plungers.

19. In a gear shifting mechanism, a shiftable actuating member, a clutch lever, operatively connected to the actuating member to cause a movement of the actuating member upon a movement of the clutch lever in either direction, a gear shifting member adapted through movement in one direction from a neutral position to shift one gear into operative position and through movement in the other direction to shift another gear into operative position, a pair of plungers carried by said gear shifting member and disposed one at each side of the actuating member, said plungers being shiftable into or out of the path of movement of the actuating member, a movable selector plate having a cam slot with which the plungers have operative engagement, and manually operable means for shifting the selector plate to a neutral position to cause the retraction of both of said plungers or from a neutral position in either direction to cause the projection of one or the other of said plungers.

20. In a gear shifting mechanism, a rotatable elliptical actuating member, a clutch lever operatively connected to the actuating member to cause an oscillation of the latter upon an oscillation of the former, a gear shifting member adapted through movement in one direction to shift one gear into operative position and through movement in the other direction to shift another gear into operative position, a pair of plungers carried by said member and disposed one at each side of the actuating member and adapted to be engaged thereby when projected, said plungers being shiftable into or out of the path of movement of the actuating member, a movable selector plate having a cam with which the plungers have operative engagement, and manually operable means for shifting the selector plate to neutral position to cause the retraction of both of said plungers or from neutral position in either direction to cause the projection of one or the other of said plungers.

21. In a gear shifting mechanism a rotatable actuating cam, a clutch lever, an arm operatively connected with the actuating cam, a slotted link operatively connecting the arm with the clutch lever, a gear shifting member adapted through movement from neutral position in one direction to shift one gear into operative position and through movement in the other direction to shift another gear into operative position, a pair of plungers carried by said member and disposed one at each side of the actuating member, said plungers being shiftable into or out of the path of movement of the actuating member, a shiftable selector plate having a cam with which the plungers have operative engagement, and manually operable means for shifting the selector plate to a neutral position to cause the retraction of both of said plungers or from a neutral position in either direction to cause a projection of one or the other of said plungers.

22. In a gear shifting mechanism, a shiftable actuating member, a gear shifting member adapted through movement in one direction from neutral position to shift one gear into operative position and through movement in the other direction to shift another gear into operative position, a pair of plungers carried by said member and disposed one at each side of the actuating member, said plungers being shiftable into or out of the path of movement of the actuating member, a movable selector plate having a cam with which the plungers have operative engagement, said selector plate when in neutral position holding both of said plungers retracted and when shifted relative to the plungers in one or the other direction causing the projection of one or the other of the plungers, a selector shaft, a handle engaging therewith whereby the shaft may be oscillated, a rod operatively connected to said shaft for reciprocation, said rod being operatively connected to the cam plate, a clutch lever, and means operatively connecting the clutch lever to the actuating member.

23. In a gear shifting mechanism, a manually shiftable actuating member, a pivotally supported gear shifting member movable in opposite directions from neutral position, a pair of diverging arms extending up on each side of but out of alinement with the actuating member, plunger carried by each arm and shiftable into or out of the path of movement of the actuating member, a sector rotatably mounted on an axis coincident with the axis of the gear shifting member, the periphery of the sector being formed with a cam having a middle portion and offset end portions, connections between the cam and said plungers whereby upon relative movement of the sector and the gear shifting member from neutral position to cause a retraction or projection of one or the other of the plungers, and manually operable means for shifting the sector to or from the neutral position in either direction.

24. In a gear shifting mechanism, a manually shiftable actuating member, a gear shifting member carrying a pair of plungers disposed one on each side of the actuating cam, and a plunger operating member disposed parallel to the gear shifting member and having means for causing a retraction of the plungers when the middle of the plunger operating member is equidistant between the plungers but causing a projection of one plunger or the other into the path of movement of the actuating member when the gear shifting member and the plunger operating member are shifted relative to each other in one or the other direction from neutral position.

25. In gear shifting mechanism, a manually shiftable actuating member, a pivotally supported gear shifting member movable in opposite directions from a neutral position, a pair of diverging arms extending up on each side of but out of alinement with the actuating member, plungers carried by each arm and shiftable into or out of the path of movement of the actuating member, a sector mounted on an axis coincident with the axis of the gear shifting member, the periphery of the sector being formed with a cam slot having a middle portion and offset end portions connected to the middle portion by inclined portions, said slot having operative engagement with the plungers whereby upon a relative movement of the sector and gear shifting member from neutral position in either direction to cause a retraction or projection of one or the other of the plungers, and manually operable means for shifting the sector to or from a neutral position in either direction.

26. In a gear shifting mechanism, a rotatably mounted elliptical actuating cam, a clutch lever, operative connections between the cam and the clutch lever whereby to oscillate the cam upon an oscillation of the clutch lever, a pivotally supported gear shifting member movable in opposite directions from neutral position and carrying a pair of diverging arms extending at each side of but out of alinement with the actuating member, plungers carried one by each arm and shiftable into or out of the path of movement of the actuating member, a sector rotatable upon the same axis as the shifting member and disposed in parallel relation thereto, the periphery of the sector being formed with a cam slot having a middle portion and offset end-portions, operative connections between each of the plungers and said cam slot, and manually operable means for shifting the sector from a neutral position in either direction whereby to cause the projection of one or the other of the plungers, the same cam slot, when the middle of the cam slot is equidistant between the plungers, causing a retraction of the plungers and causing a projection of one plunger or the other when the gear shifting member and the sector are shifted relative to each other in opposite directions.

27. In a gear shifting mechanism, a rotatable elliptical cam, a clutch lever operatively connected to the cam to oscillate the latter, a pivotally supported gear shifting member movable in opposite directions from a neutral position and having a pair of diverging arms extending at each side of but out of alinement with the actuating cam, a plunger carried by each arm and shiftable into or out of the path of movement of the actuating member, said plungers being shiftable into or out of the path of movement of the actuating cam, a sector rotatable upon the same axis as the gear shifting member and having a periphery formed with a cam slot, the cam slot having a middle portion and offset end portions, operative connections between the plungers and the cam slot, a lug extending upward from the sector, a rod having a yoke embracing said lug and operatively connected thereto, and a shaft operatively connected to the rod.

28. In a gear shifting mechanism, oppositely disposed parallel gear shifting members pivotally mounted on a common axis and each having a pair of diverging arms each having a head at its extremity, a rotatable elliptical cam disposed above the axis of the gear shifting members and equidistant between the two pairs of heads, plungers disposed in said heads and movable into or out of the path of movement of the cam, and manually operable means for retracting or projecting one or the other of said plungers.

29. In a gear shifting mechanism, oppositely disposed parallel gear shifting members pivotally mounted on a common axis and each having a pair of diverging arms each having a head at its extremity, a rotatable elliptical cam disposed above the axis of the gear shifting members and equidistant between the two pairs of heads, plungers disposed in said heads and movable into or out of the path of movement of the cam, selector plates movable parallel to the arms, each having a cam thereon operatively engaging the plungers of the correlated gear shifting member, said cams each having a middle portion and two offset end portions, and manually operable means for shifting said plates to or from a neutral position in either direction, the said plates when the plates and gear shifting members are in neutral position, holding the plungers retracted while a relative movement of either plate and its gear shifting member in either direction from or toward neutral position causes a projection or retraction of one or the other of the plungers.

30. In a gear shifting mechanism, oppositely disposed parallel gear shifting members mounted on a common axis, each having a pair of diverging arms carrying heads at the extremities thereof, a rotatable elliptical cam disposed above the axis of the gear shifting members and equidistant between two pairs of heads, a clutch lever to which the cam is operatively connected, plungers disposed within said heads and independently shiftable into or out of the path of movement of the actuating cam, a pair of selector plates each co-acting with one pair of plungers, each selector plate having a cam formed thereon having a middle portion and offset end portions, said cam being operatively connected to the corresponding plungers whereby upon a relative movement of the selector plate and the corresponding gear shifting member from or toward a neutral position one or the other of the plungers will be projected or retracted, operating rods connected to the selector plates, a pair of shafts each connected to one of said rods, and means for independently operating either shaft.

31. In a gear shifting mechanism, oppositely disposed gear shifting members pivoted on a common axis and each having a pair of upwardly extending diverging arms, each arm having a hollow head at its extremity, a rotatable elliptical actuating cam disposed above the axis of the gear shifting members and equidistant between the two pairs of heads, laterally movable plungers carried one in each head and independently shiftable into or out of the path of movement of the actuating cam, a pair of sectors having their axes coincident with the axis of the gear shifting members, the periphery of each sector having a cam slot formed therein, each slot having a middle portion and two offset end portions, each cam slot being operatively engaged by the corresponding pair of plungers, the cam slots causing the retraction of the plungers when the sectors and corresponding gear shifting members are in neutral position but causing a projection or retraction of one or the other of the plungers when either gear shifting member and its sector are relatively moved, operating rods connected one to each sector, sector gears operatively connected to each rod, independent concentric shafts having bevel gears, each connected to one of said sector gears, one of the shafts being longer than the other and extending through the latter, and a selecting handle movable into engagement with either shaft and mounted for rotation in either direction.

32. In a gear shifting mechanism, a pair of spaced gear shifting members swingingly mounted, an actuating member disposed between the gear shifting members, a pair of plungers carried by each gear shifting member, one at either side of the actuating member, and manually operable means for selectively projecting the plungers.

33. In a gear shifting mechanism, a pair of spaced gear shifting members swingingly mounted, an actuating member disposed between the gear shifting members, a pair of plungers carried by each gear shifting member, one at either side of the actuating member, and manually operable means for selectively projecting the plungers, said means being such that only one plunger may be projected at a time and that no plunger may be projected while another one is in projected position.

34. In a gear shifting mechanism, a pair of spaced gear shifting members swingingly mounted, an actuating member disposed between the gear shifting members, a pair of plungers carried by each gear shifting member, one at either side of the actuating member, and manually operable means for selectively projecting the plungers, said means being such that the projection of any plunger will cause retraction of any other plunger which may be in projected position.

35. In a gear shifting mechanism, a pair of spaced gear shifting members swingingly mounted, an actuating member disposed between the gear shifting members, a pair of plungers carried by each gear shifting member, one at either side of the actuating member, and manually operable means for selectively projecting the plungers, said means being such that all plungers may be held in retracted position although but one plunger can be projected at any one time.

36. In a gear shifting mechanism, a pair of spaced gear shifting members swingingly mounted, a pair of spaced plungers carried by each gear shifting member, means for selectively projecting the plungers, and clutch pedal operated means for engaging any projected plunger to operate its gear shifting member.

37. In a gear shifting mechanism, a pair of spaced gear shifting members swingingly mounted, a pair of spaced plungers carried by each gear shifting member, means for selectively projecting the plungers, and clutch pedal operated means for engaging any projected plunger to operate its gear shifting member, the projecting means of the plungers being such that when any gear shifting member has been moved through engagement of one of its plungers by the actuating means such plunger will be retracted.

38. In a gear shifting mechanism, a pair of spaced gear shifting members swingingly mounted, a pair of spaced plungers carried by each shifting member, means for selectively projecting the plungers, and clutch pedal operated means for engaging any projected plunger to operate its gear shifting member, the actuating means and the plunger projecting means being such that when all plungers are retracted and the clutch pedal is in inactive position no plunger can be projected.

In testimony whereof I affix my signature in presence of two witnesses.

JOHN CLAYTON BACKUS. [L. S.]

Witnesses:
F. E. DUNBAR,
M. M. POMEROY.